(12) United States Patent
Lan

(10) Patent No.: US 10,093,859 B2
(45) Date of Patent: Oct. 9, 2018

(54) ALIGNMENT FILM, PREPARATION METHOD AND LIQUID CRYSTAL DISPLAY PANEL

(71) Applicant: Shenzhen China Star Optoelectronics Technology Co., Ltd., Shenzhen, Guangdong (CN)

(72) Inventor: Song Lan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 263 days.

(21) Appl. No.: 14/894,930

(22) PCT Filed: Oct. 28, 2015

(86) PCT No.: PCT/CN2015/093099
§ 371 (c)(1),
(2) Date: Nov. 30, 2015

(87) PCT Pub. No.: WO2017/054274
PCT Pub. Date: Apr. 6, 2017

(65) Prior Publication Data
US 2017/0190973 A1    Jul. 6, 2017

(30) Foreign Application Priority Data

Sep. 29, 2015 (CN) .......................... 2015 1 0633573

(51) Int. Cl.
*C09K 19/54* (2006.01)
*G02F 1/1337* (2006.01)
*C09K 19/56* (2006.01)

(52) U.S. Cl.
CPC .......... *C09K 19/542* (2013.01); *G02F 1/1337* (2013.01); *C09K 19/56* (2013.01);
(Continued)

(58) Field of Classification Search
CPC .................. C09K 19/542; C09K 19/56; C09K 2019/548; G02F 1/1337; G02F 1/133711;
(Continued)

(56) References Cited

FOREIGN PATENT DOCUMENTS

CN        101717647 A     6/2010
CN        104903786 A     9/2015

*Primary Examiner* — Ruiyun Zhang
(74) *Attorney, Agent, or Firm* — Andrew C. Cheng

(57) ABSTRACT

The invention relates to the field of liquid crystal technology, and more particularly to an alignment film being applied in a PSVA liquid crystal display panel and including a first branched chain M and a second branched chain Q bonded on polyimide as a main chain and thus having a structure as shown in the following formula:

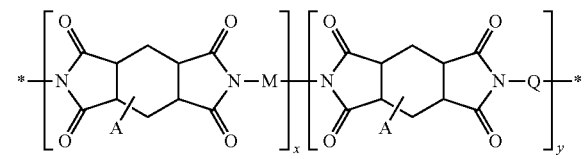

The first branched chain M is a group applied to deflect the liquid crystal in a distribution state; the second branched chain Q is a group containing nitrobenzophenone or benzoquinonyl. The invention also provides a liquid crystal display panel using the alignment film. The invention can effectively suppress the broken bright point issue of panel and thereby improve panel quality.

10 Claims, 1 Drawing Sheet

(52) U.S. Cl.
CPC ....... *G02F 1/133711* (2013.01); *Y10T 428/10* (2015.01); *Y10T 428/1005* (2015.01); *Y10T 428/1023* (2015.01)

(58) Field of Classification Search
CPC ... G02F 1/133723; G02F 2001/133765; G02F 2001/133738; G02F 2001/133742; Y10T 428/10; Y10T 428/1005; Y10T 428/1018; Y10T 428/1023
USPC ........ 428/1.1, 1.2, 1.25, 1.26; 349/123, 130, 349/132; 528/346, 347, 353
See application file for complete search history.

ALIGNMENT FILM, PREPARATION METHOD AND LIQUID CRYSTAL DISPLAY PANEL

BACKGROUND OF THE INVENTION

1. Field of the Invention

The invention relates to the field of liquid crystal display technology, and more particularly to an improved structure of a liquid crystal display panel.

2. Description of the Related Art

In conventional TFT-LCD, vertical alignment (VA) display is a common mode because of advantages like wide viewing angles, high contrast and without the need of rubbing alignment. VA technologies are mainly divided into multi-domain vertical alignment (MVA) technology, patterned vertical alignment (PVA) technology and continuous pinwheel alignment (CPA) technology. In all of the VA technologies, protrusions or slits should be disposed on color filter (CF) side, which would increase cost and decrease transmittance of display screen. In order to solve the problem of the CF side being driven by point-control or line-control to area-control, a new VA display technology named as polymer stabilization vertical alignment (PSVA) technology has been proposed.

The most distinguishing characteristic of the PSVA technology is that a polymer layer for making VA liquid crystal to form a pre-tilt angle is formed on an alignment film. As shown in FIG. 1(a), conventional PSVA liquid crystal panels each include two oppositely disposed substrates, the substrates can include an outer layer of glass plate G and a circuit board ITO attached on an inner side of the glass plate. A liquid crystal (LC) with reactive mesogen (RM) is disposed between the two substrates. The RM is a phototaxis monomer containing double bonds. Before being irradiated by UV light, a voltage is applied between the two substrates to make the liquid crystal (LC) form pre-tilt angles, as shown in FIG. 1(b), tilt directions of liquid crystal molecules vary according to different domains. After forming the pre-tilt angles by utilizing the externally applied voltage, RM polymerizes to be a polymer network structure RM' under a particular UV light irradiation, which can attract surface liquid crystal molecules and make them form specific pre-tilt angles (as shown in FIG. 1(c)); after the UV radiation, the applied voltage is withdrawn, the liquid crystal (LC) molecules still can be kept with pre-tilt angles with certain degrees (shown in FIG. 1(d)).

However, when RM is irradiated by UV light, free radical polymerization will react, if the illuminance of the UV light is too high, a concentration of primary free radical will be high during initial stage of reaction, which would lead to excessively fast reacting of RM and excessively large size of bump on surface (bump formed by polymerization of RM), orientation directions of LC will be adverse and broken bright point will occur.

At present, in order to solve the problem, the most commonly used method is adding a specific dose of polymerization inhibitor (between 0.1%-1%) in LC, the polymerization inhibitor can be two kinds in the following, one is phenols, the other is quinones, principles of polymerization inhibition are as follows:

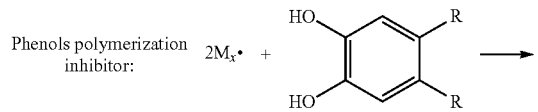

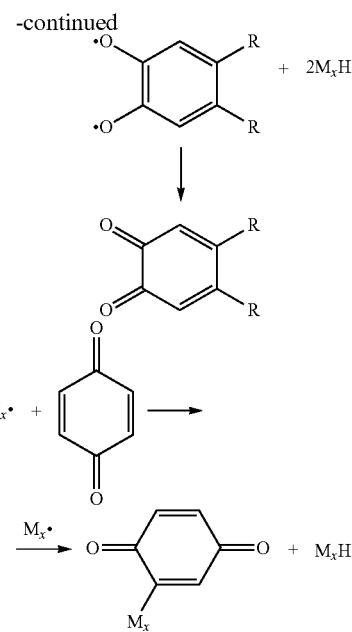

Essence of the two polymerization inhibitors is decreasing the concentration of free radicals of RM during initial stage of reaction and slowing down speed of RM reaction so as to reduce the size of the bumps and improve distribution uniformity of the bumps. But for the two types of polymerization inhibitors, any type polymerization would change the structure itself, bisphenol would be transformed into diquinone, 1,4-benzoquinone would be transformed into 1,4-benzoquinone containing active group fragments. The structural change would cause variation of physical characteristic parameters like $\Delta n$, $\Delta \varepsilon$, etc., and thereby influence optical properties of LC and deteriorate panel quality.

SUMMARY

In order to overcome the shortcomings of prior art, the invention provides an alignment film applied in a PSVA liquid crystal display panel. The alignment film includes a first branched chain M and a second branched chain Q bonded on a main chain of polyimide and has a structure as shown in formula 1:

Formula 1

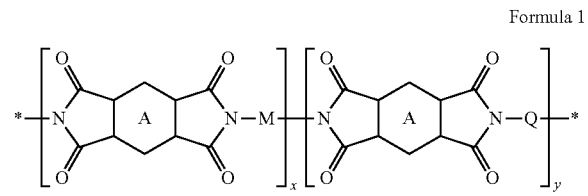

where the first branched chain M is a group applied to deflect the liquid crystal molecules under a power distribution state, i.e., voltage-applied state; the second branched chain Q is a group containing a nitrobenzophenone or a benzoquinonyl; the x and y represent degrees of polymerization of the first branched chain M and the second branched chain Q respectively. The structural unit A represents: a naphthenic hydrocarbonthe, an aryl radical or a polycyclic aromatic hydrocarbon with the number of carbon atom no more than 12; or represents a cycloalkyl, an aromatic base or a polycyclic aromatic base with the number of carbon atom no more than 12, and one or more H atoms of the cycloalkyl, the aromatic base or the polycyclic aromatic base are substituted by halogen atoms, alkoxy groups or ester groups.

In one embodiment, a mole ratio of amount of substance of the first branched chain M to amount of substance of the second branched chain Q is 1:(0.1~1); number of moles of a monomer before being polymerized to the main chain is no less than a sum of number of moles of monomers before being polymerized to the first branched chain M and the second branched chain Q.

In one embodiment, a structure of the second branched chain Q is as shown in formula 2:

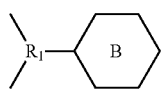

Formula 2

The R1 represents an alkyl radical containing 2~10 carbon atoms, or a group containing —O(CO)— and 2~10 carbon atoms, or a group containing —N(CO)— and 2~10 carbon atoms; the group B represents benzoquinonyl or nitrobenzophenone.

In one embodiment, a structure of the group B is as shown in formula 4, 5, or 6:

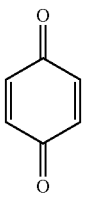

Formula 4

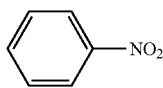

Formula 5

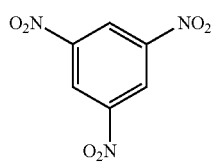

Formula 6

In one embodiment, a structure of the first branched chain M is as shown in formula 3:

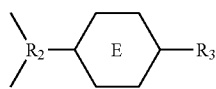

Formula 3 where the $R_2$ represents an alkyl radical containing 2~10 carbon atoms, or a group containing —O(CO)— and 2~10 carbon atoms, or a group containing —N(CO)— and 2~10 carbon atoms; the group E represents a group containing 2~5 five-membered rings and/or six-membered rings and/or benzene rings and/or condensed rings connected in sequence; R3 represents an alkyl radical containing 1~12 carbon atoms, or a group containing 1~12 carbon atoms and one or more of —F, —Cl, —CF3, —CN, —NCS, —OCF3 substituting for H atom.

The invention also provides a liquid crystal display panel including two oppositely disposed substrates, a liquid crystal containing a reactive mesogen is disposed between the two substrates, and a side of each the substrate adjacent to the liquid crystal is disposed with the alignment film according to any one of the above embodiments.

The invention also provides a preparation method of an alignment film applied in a PSVA liquid crystal display panel, including the following steps:

I. adding a dianhydride monomer p, a diamine monomer n containing a first branched chain and a diamine monomer m containing a second branched chain into an organic solvent and stirring for more than 24 h to obtain a precursor of alignment film; wherein a mole ratio of n:m=1: (0.1~1), and number of moles of p≥n+m;

II. coating the precursor of alignment film on a substrate; toasting the coated substrate at 180~230° C. for more than 30 minutes to dehydrate and polymerize the precursor of alignment film to be a polymer so as to form an alignment film; a structure of the alignment film containing a first branched chain M and a second branched chain Q bonded on a main chain of polyimide is shown in formula 1:

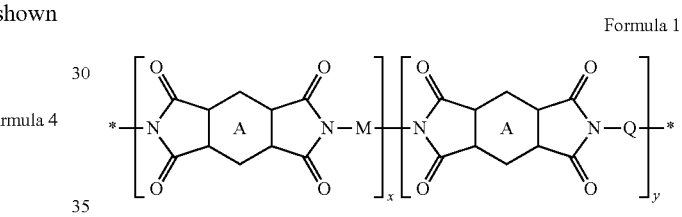

Formula 1

Wherein the first branched chain M is a group applied to deflect the liquid crystal molecules under a power distribution state; the second branched chain Q is a group containing a nitrobenzophenone or a benzoquinonyl; the x and y represent degrees of polymerization of the first branched chain M and the second branched chain Q respectively. The structural unit A represents: a naphthenic hydrocarbonthe, an aryl radical or a polycyclic aromatic hydrocarbon with the number of carbon atom no more than 12; or represents a cycloalkyl, an aromatic base or a polycyclic aromatic base with the number of carbon atom no more than 12 and one or more H atoms of the cycloalkyl, the aromatic base or the polycyclic aromatic base are substituted by halogen atoms, alkoxy groups or ester groups.

In one embodiment, the organic solvent is one or more of N-methyl pyrrolidone, N-ethyl pyrrolidine, γ-caprolactone, dimethyl sulphoxide and dichloromethane.

Benefits:

The invention points out that groups with polymerization inhibition characteristic are connected in form of short side chain onto an alignment film (PI), on one hand, the groups with polymerization inhibition characteristic can extend into LC to contact with RM, and therefore can slow down speed of RM polymerization, increase distribution uniformity of bumps and improve broken bright point issue of panel; on the other hand, as the short side chain is fixed in the alignment film, there is no need of directly adding a polymerization inhibitor into LC, which can limit the influence of structural change of the polymerization inhibitor after being irradiated onto LC physical parameters and therefore enhance quality of panel.

DETAILED DESCRIPTION

With the following reference to accompanying drawings, concrete embodiments of the invention will be described in detail.

Figure 1:
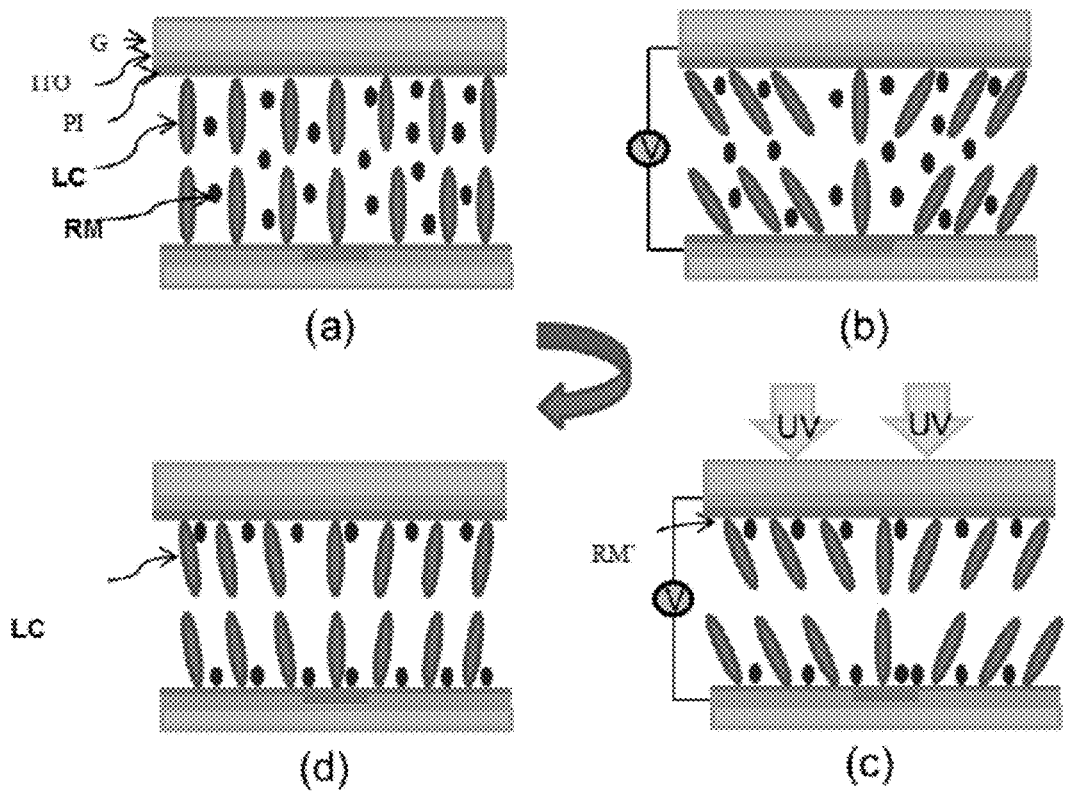
FIG. 1 is a workflow chart of a conventional PSVA liquid crystal display panel.

The invention provides a new alignment film material with polymerization inhibition characteristic, a structure of the alignment film is as in FIG. 1, including a first branched chain M and a second branched chain Q:

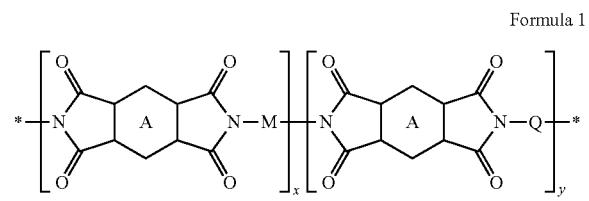

Formula 1 where the x and y represent degrees of polymerization of the first branched chain M and the second branched chain Q respectively, molecular weight of the formed alignment film is generally $5 \times 10^3 \sim 5 \times 10^5$; ranges of x and y can be adjusted according to molecular weights of side chains so as to guarantee the molecular weight of the alignment film is in an appropriate scale.

The structural unit A represents: a naphthenic hydrocarbon the, an aryl radical or a polycyclic aromatic hydrocarbon with the number of carbon atom no more than 12; or represents a cycloalkyl, an aromatic base or a polycyclic aromatic base with the number of carbon atom no more than 12, and one or more H atoms of the cycloalkyl, the aromatic base or the polycyclic aromatic base are substituted by halogen atoms, alkoxy groups or ester groups.

A mole ratio of amount of substance of the first branched chain M to amount of substance of the second branched chain Q is $1:(0.1 \sim 1)$; number of moles of a monomer before being polymerized to the main chain is no less than a sum of number of moles of monomers before being polymerized to the first branched chain M and the second branched chain Q.

The first branched chain M is a side chain with rigid group like a benzene ring and long chain alkyl, which can make LC be perpendicularly aligned/orientated in an initial state, a structure of the first branched chain M is as shown in formula 3:

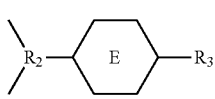

Formula 3 where the $R_2$ represents an alkyl radical containing 2~10 carbon atoms, or a group containing —O(CO)— and 2~10 carbon atoms, or a group containing —N(CO)— and 2~10 carbon atoms; the group E represents a group containing 2~5 five-membered rings and/or six-membered rings and/or benzene rings and/or condensed rings connected in sequence; R3 represents an alkyl radical containing 1~12 carbon atoms, or a group containing 1~12 carbon atoms and one or more of —F, —Cl, —CF3, —CN, —NCS, —OCF3 substituting for H atom.

The second branched chain Q is a side chain with polymerization inhibition characteristic, including a group of nitrobenzophenone or benzoquinonyl. A structure of the second branched chain Q is as shown in formula 2:

Formula 2

The $R_1$ represents an alkyl radical containing 2~10 carbon atoms, or a group containing —O(CO)— and 2~10 carbon atoms, or a group containing —N(CO)— and 2~10 carbon atoms; the group B represents a group with polymerization inhibition characteristic such as benzoquinonyl or nitrobenzophenone.

For example, benzoquinones like 1,4-benzoquinone, is shown in formula 4:

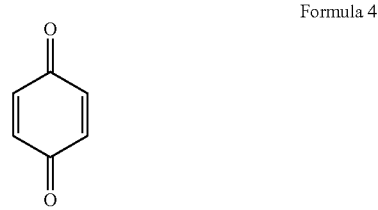

Formula 4

Nitrobenzol (as shown in formula 5) or 2,4,6-trinitrobenzene (as shown in formula 6), like:

Formula 5

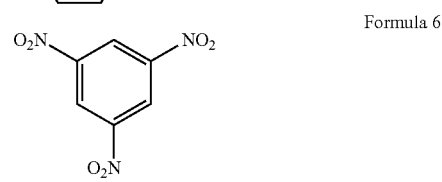

Formula 6

To maximize the effect of polymerization inhibition, a benzoquinonyl or a nitrobenzol is connected to the end of the second branched chain Q to make it contact with RM to the highest extent, slow down the speed of RM reaction, decrease size of bump and improve distribution uniformity of bump.

Figure 2:
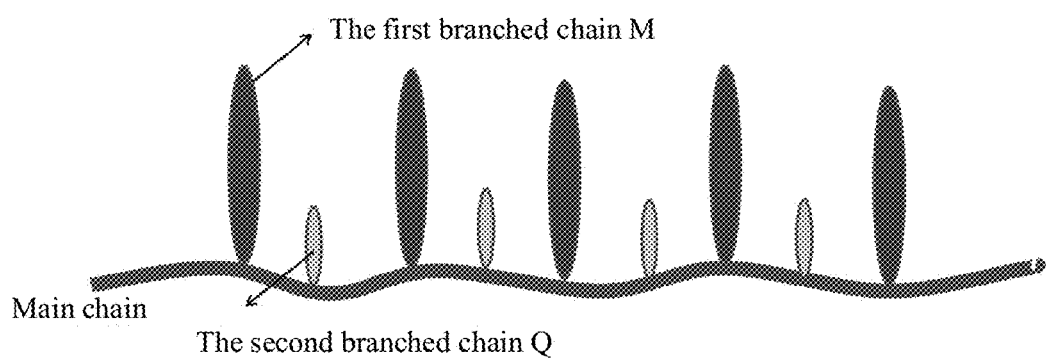
FIG. 2 is a schematic structural view of an alignment film according to the invention.

A schematic structural view of an alignment film of the invention is as shown in FIG. 2, during practical process, the longer first branched chain M maintains stable orientation direction to LC; the shorter second branched chain Q offers polymerization inhibition function. The second branched chain Q can extend into LC to contact with RM on one hand, which can slow down speed of RM polymerization and increase distribution uniformity of bump; on the other hand, as the second branched chain is fixed in the alignment film, there is no need of directly adding the polymerization inhibitor into LC, which can limit residual concentration of polymerization inhibitor in LC after being irradiated and thereby guarantee subsequent quality of LC.

In the following, a preparation method of an alignment film of the invention will be introduced.

A dianhydride monomer p (a monomer molecule before being polymerized to be a main chain of the exemplary embodiment, such as shown in formula 7(b)), a monomer molecule n of the first branched chain M before polymerization (a diamine monomer, such as shown in formula 7(b)), and a monomer molecule m of the second branched chain Q before polymerization (a diamine monomer, such as shown in formula 7(c)) are provided. A mole ratio of amount of substance of the monomer molecule of the first branched chain M to amount of substance of the monomer molecule of the second branched chain Q is n:m=1:(0.1~1), and number of moles of substance of dianhydride monomer is no less than sum of n and m in the exemplary embodiment.

The monomer molecules of the first branched chain M and the second branched chain Q are dissolved in an organic solvent N-methyl pyrrolidone (NMP) to form a solution, mess percentage of NMP in the alignment film solution is 90~95% (the solvent can be one or more of N-ethyl pyrrolidine, γ-caprolactone, dimethyl sulphoxide and dichloromethane instead), and then is stirred at room temperature for 24 hours to obtain an alignment film precursor of polyamide acid (PAA, as shown in formula 7(d)); then the PAA is coated on a substrate, then the coated substrate is toasted at 180~230° C. for 30 min, the solvent can fully evaporate while the PAA dehydrates to be a ring for forming a PI film.

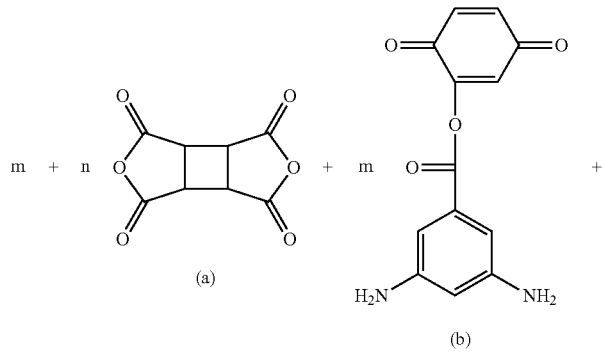

(a)    (b)

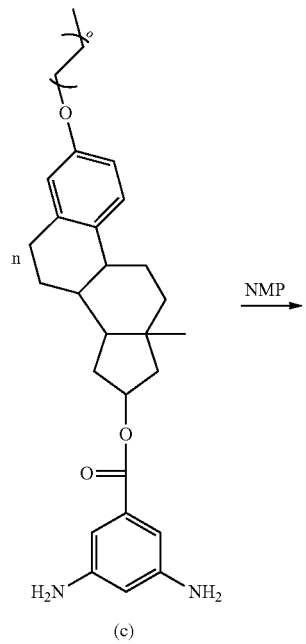

(c)

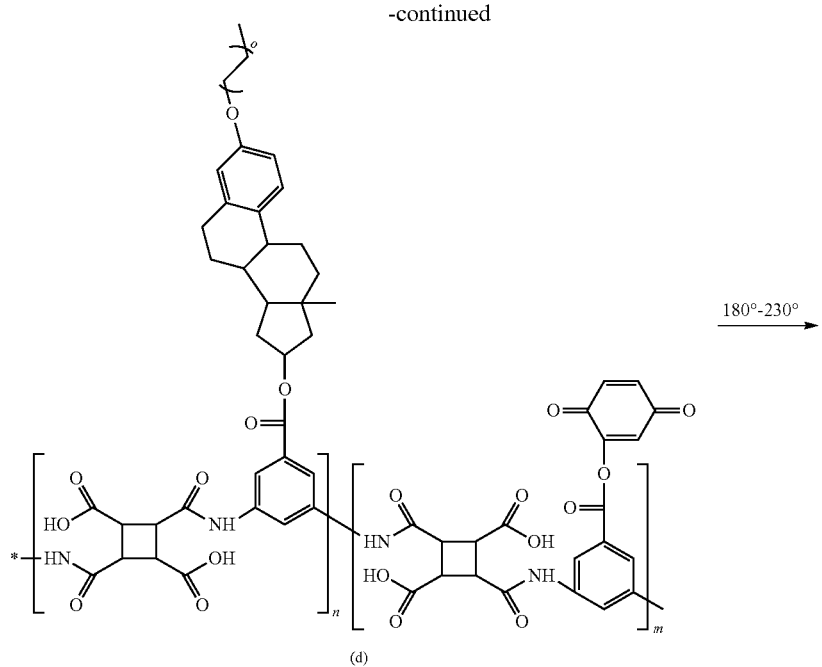

(d)

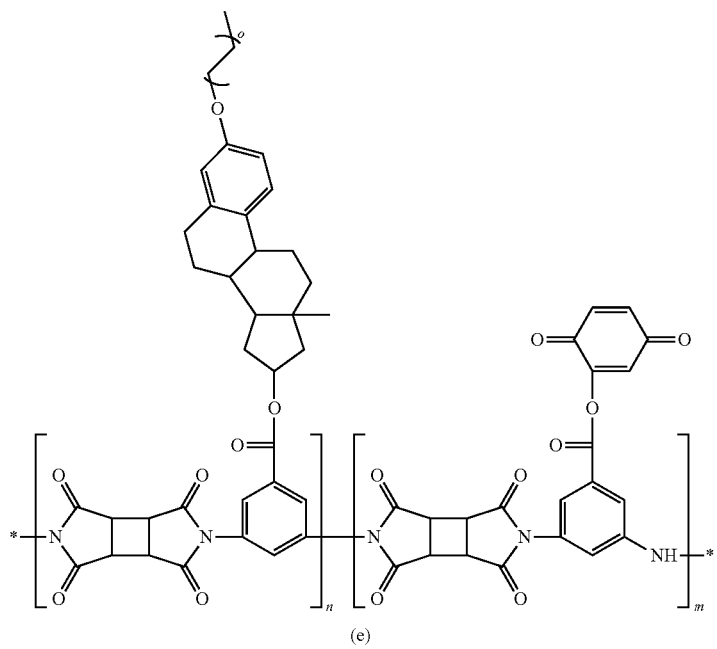

(e)

Formula 7

A PSVA liquid crystal display panel using the alignment film includes two oppositely disposed substrates and a liquid crystal containing a reactive mesogen disposed between the two substrates. A side of each the substrate adjacent to the liquid crystal is disposed with the alignment film. The alignment film includes the first branched chain M and the second branched chain Q bonded on a main chain of polyimide, which makes the alignment film have the structure as shown in formula 1 as well as its function.

What is claimed is:

1. An alignment film applied in a liquid crystal display panel, wherein a structure of the alignment film containing a first branched chain M and a second branched chain Q bonded on a main chain of polyimide is as shown in formula 1 that:

Formula 1

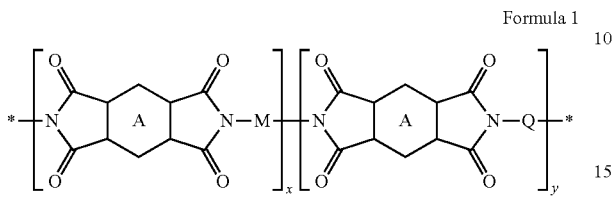

wherein the first branched chain M is a group applied to deflect liquid crystal molecules under a power distribution state; the second branched chain Q is a group containing a nitrobenzophenone or a benzoquinonyl; the x and y represent degrees of polymerization of the first branched chain M and the second branched chain Q respectively;
the structural unit A represents:
a cycloalky or an aryl with a number of carbon atom no more than 12, wherein one or more H atoms of the cycloalkyl or the aryl may be substituted by a halogen atom, an alkoxy group or an ester group.

2. The alignment film according to claim 1, wherein a mole ratio of the first branched chain M to the second branched chain Q is 1:0.1~1; and number of moles of a monomer of the main chain before polymerization is no less than a sum of number of moles of a monomer of the first branched chain M before polymerization and number of moles of a monomer of the second branched chain Q before polymerization.

3. The alignment film according to claim 1, wherein a structure of the second branched chain Q is as shown in formula 2:

Formula 2

the $R_1$ represents a group containing —O(CO)— or —N(CO)— and 2~10 carbon atoms; the group B represents benzoquinonyl or nitrobenzophenone.

4. The alignment film according to claim 2, wherein a structure of the second branched chain Q is as shown in formula 2:

Formula 2

the $R_1$ represents a group containing —O(CO)— or —N(CO)— and 2~10 carbon atoms; the group B represents benzoquinonyl or nitrobenzophenone.

5. The alignment film according to claim 4, wherein a structure of the group B is as shown in formula 4:

Formula 4

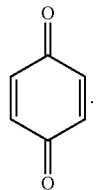

6. The alignment film according to claim 1, wherein a structure of the first branched chain M is as shown in formula 3:

Formula 3

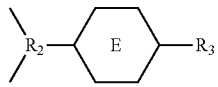

where the $R_2$ represents a group containing —O(CO)— or —N(CO)— and 2~10 carbon atoms; the group E represents a group containing at least 2~5 five-membered rings, six-membered rings, benzene rings, and condensed rings connected in sequence; $R_3$ represents a group containing 1~12 carbon atoms and one or more of —F, —Cl, —CF$_3$, —CN, —NCS, —OCF$_3$ substituting for H atom.

7. The alignment film according to claim 2, wherein a structure of the first branched chain M is as shown in formula 3:

Formula 3

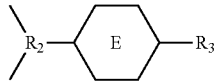

where the $R_2$ represents a group containing —O(CO)— or —N(CO)— and 2~10 carbon atoms; the group E represents a group containing at least 2~5 five-membered rings, six-membered rings, benzene rings, and condensed rings connected in sequence; $R_3$ represents a group containing 1~12 carbon atoms and one or more of —F, —Cl, —CF$_3$, —CN, —NCS, —OCF$_3$ substituting for H atom.

8. A liquid crystal display panel, comprising two oppositely disposed substrates and a liquid crystal containing a reactive mesogen disposed between the two substrates, a side of each of the substrates adjacent to the liquid crystal being disposed with an alignment film; wherein a structure of the alignment film containing a first branched chain M and a second branched chain Q bonded on a main chain of polyimide is shown in formula 1:

Formula 1

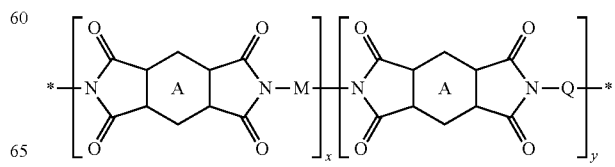

where the first branched chain M is a group applied to deflect the liquid crystal molecules under a power distribution state; the second branched chain Q is a group containing a nitrobenzophenone or a benzoquinonyl; the x and y represent degrees of polymerization of the first branched chain M and the second branched chain Q respectively;

the structural unit A represents:
a cycloaky or an aryl with a number of carbon atom no more than 12; wherein one or more H atoms of the cycloalkyl or the aryl may be substituted by a halogen atoms, an alkoxy groups or an ester group.

9. A preparation method of an alignment film applied in a liquid crystal display panel, comprising following steps:

I. adding a dianhydride monomer p, a diamine monomer n containing a first branched chain and a diamine monomer m containing a second branched chain into an organic solvent and stirring for more than 24 h to obtain a precursor of alignment film;
wherein a mole ratio of n:m=1:0.1~1, and number of moles of p≥n+m;

II. coating the precursor of alignment film on a substrate, toasting the coated substrate at 180~230° C. for more than 30 minutes to dehydrate and polymerize the precursor to form an alignment film containing a first branched chain M and a second branched chain Q bonded on a main chain of a polyimide as shown in formula 1:

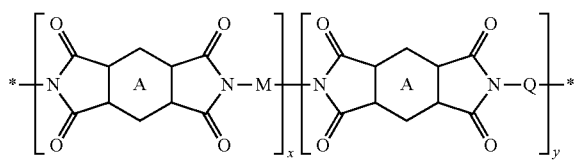

Formula 1 where the first branched chain M is a group applied to deflect the liquid crystal molecules under a power distribution state; the second branched chain Q is a group containing a nitrobenzophenone or a benzoquinonyl; the x and y represent degrees of polymerization of the first branched chain M and the second branched chain Q respectively;

the structural unit A represents:
a cycloalkyl or an aryl with a number of carbon atom no more than 12, wherein on or more H atoms of the cycloalkyl or the aryl may be substituted by a halogen atom, an alkoxy group or an ester group.

10. The preparation method of an alignment film according to claim 9, wherein the organic solvent is one or more of N-methyl pyrrolidone, N-ethyl pyrrolidine, γ-caprolactone, dimethyl sulphoxide and dichloromethane.

* * * * *